Patented Mar. 28, 1950

2,501,927

UNITED STATES PATENT OFFICE 2,501,927

ANION EXCHANGE RESIN IN ANTI-IRRITATION POWDER

Richard J. Block, Scarsdale, N. Y.

No Drawing. Application May 26, 1945
Serial No. 596,081

3 Claims. (Cl. 167—58)

My invention relates to a novel composition adapted to prevent epidermal irritation due to alkaline irritating factors and more particularly my invention relates to a composition adapted to prevent diaper rash in an infant.

Various alleviating compounds or emolients have been suggested to prevent irritation of infant's skin, commonly called diaper rash, which is apparently due to the contact of urine with the infant's skin, but none has been particularly successful in accomplishing its objectives. Talc, the mixture most commonly employed, is simply an absorbent and has no chemical effect. The irritation appears to be due to ammonia or ammonium compounds released from the urine. However, compounds or materials on the acid side cannot well be used because there is not always an alkali present for the acid to react with and in that event the acid nature of the compound may in itself cause skin irritation.

It is the object of the present invention to provide a compound and a mixture for the prevention of skin irritation.

It is a further object of the present invention to provide a novel substantially neutral neutralizing agent that will neutralize any alkali present and prevent any undesirable effects from it.

It is a further object of the present invention to provide a novel combination of absorbent material and neutralizing agent adapted to prevent diaper rash.

I have found that these objects can be accomplished by means of an anion exchange compound that has been first saturated with an acid and then washed free of all excess acid. The anion exchanger should be combined with talc, since the talc absorbs moisture and gaseous or liquid by-products present. It supplements the action of the treated anion exchanger in absorbing the neutralized alkali.

Specifically in my invention I employ an acid saturated anion exchanger such as $R.NH_2.H_3PO_4$. in which R may be an aromatic amino-aldehyde radical of a resin modified before, during, or after the condensation by introducing a group that enhances the basicity of the resin. Cf. U. S. Patents Nos. 2,104,501, 2,151,883, and 2,191,853. Other suitable anion exchangers may be employed. Such anion exchangers are, for example, the resins Amberlite, IR-4, Duolite A, Gonac A-293, etc.

The anion exchanger should be in the amino or free base form. It is saturated with an acid such as sulphuric, hydrochloric, phosphoric or other acid and after being so saturated, all excess acid is washed out. The anion exchanger is then substantially neutral having a pH of from 6 to 8 and is ground to the desired size and homogeneously mixed with talc. When the compound is then applied to infant's skin, it will efficiently act to neutralize alkali, such as ammonium hydroxide or free ammonia released from urine and thus reduces or prevents irritation of the infant's skin. The combination of treated anion exchanger and talc neutralizes the alkaline by-products and absorbs any ammonia formed. It maintains a pH of about 6.

It is preferable that an anion exchanger be used as against a cation exchanger since presently known cation exchangers (pH about 5) may produce a hyperacidic condition and would in themselves produce an undesirable reaction. However, a colorless cation exchanger with the properties and pH described herein might be employed.

The combination of anion exchanger and the talc is particularly useful because the talc absorbs and substantially buffers the neutralized alkaline by-products.

The proportions I prefer to employ comprise from 3 to 50% of anion exchange compound to 97 to 50% of talc. The composition formed prevents the development of skin irritation as outlined hereinabove.

It will be understood by those skilled in the art that various additions and modifying agents may be employed and that the invention herein lies in the principles of using the non-irritating, that is non-acid or non-alkaline neutral agent, which has the property of neutralizing the alkaline products. I intend therefore to be limited not by the specific statement of my invention hereinabove, but only by the appended claims.

I claim:

1. A composition adapted to prevent skin irritation due to alkaline by-products released from urine which comprises a powdered, acid activated anion exchange resin having a pH of 6-8 and finely ground talc.

2. A composition adapted to prevent skin irritation due to alkaline by-products released from urine which comprises a powdered anion exchange resin which has been saturated with an acid and then washed free of excess acid, and finely ground talc.

3. A composition adapted to prevent skin irritation due to alkaline by-products released from urine which comprises about 3-50% of a powdered anion exchange resin which has been saturated with an acid and then washed free of excess acid, and 97–50% of finely ground talc.

RICHARD J. BLOCK.

REFERENCES CITED

The following references are of record in the file of this patent:

UNITED STATES PATENTS

| Number | Name | Date |
|---|---|---|
| 2,131,235 | Randall et al. | Sept. 27, 1938 |
| 2,185,178 | Beutner | Jan. 2, 1940 |
| 2,194,858 | Lawson | Mar. 26, 1940 |
| 2,446,527 | Melof | June 24, 1941 |
| 2,281,194 | Holmes | Apr. 28, 1942 |
| 2,341,907 | Cheetham | Feb. 15, 1944 |
| 2,354,172 | Myers | July 18, 1944 |

FOREIGN PATENTS

| Number | Country | Date |
|---|---|---|
| 378,010 | Germany | July 2, 1923 |
| 332,142 | Great Britain | July 17, 1930 |
| 305,229 | Great Britain | Feb. 1, 1929 |

OTHER REFERENCES

The Amberlites, pages 11–12, Oct. 1942.

Myers, Ind. and Eng. Chem., vol. 33, pages 697–706 (1941).

Baby Preparations, J. Kalish, Drug and Cosmetic Industry, Oct. 1941, pages 394 and 395.

Lyman, Amer. Pharmacy, J. P. Lippincott Co., 1945, page 91.

Myers et al., Industrial and Engineering Chemistry, vol. 32, No. 6, June 1, 1941, pages 697, 698.